No. 848,776. PATENTED APR. 2, 1907.
A. T. SISSON.
BALL BEARING.
APPLICATION FILED FEB. 10, 1906.
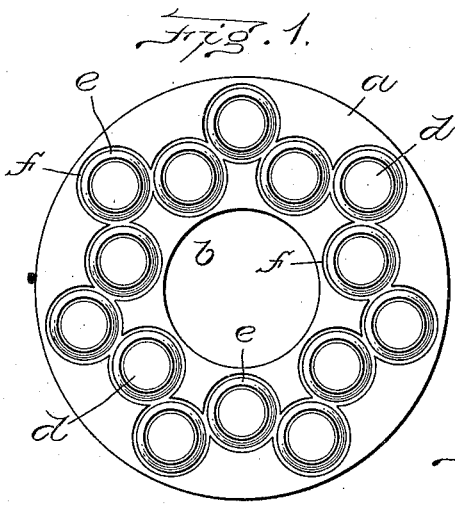
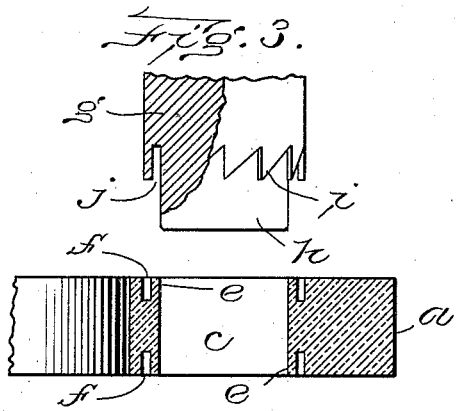
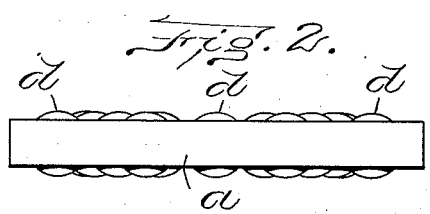
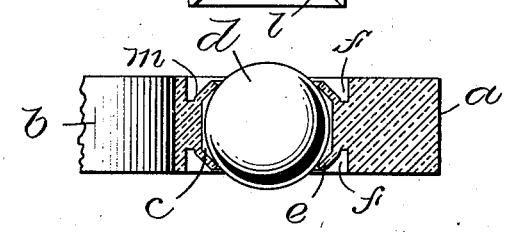
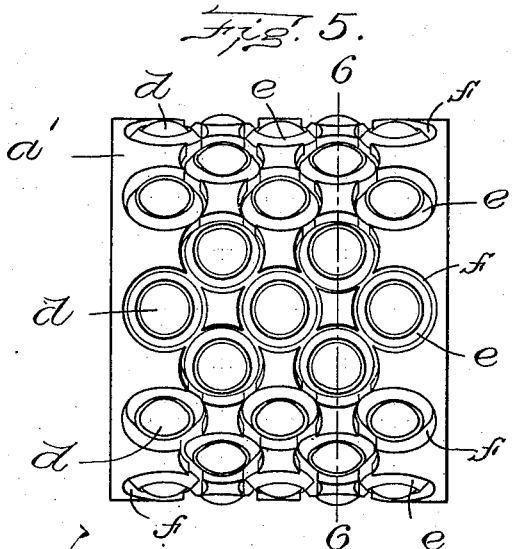
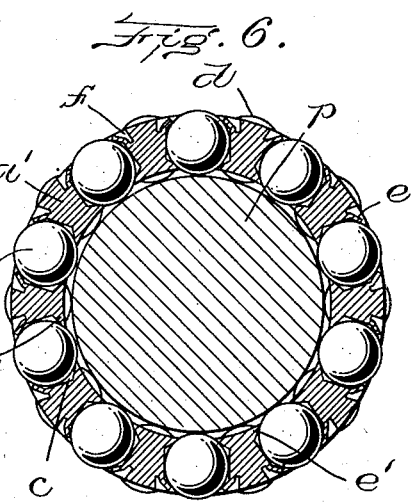
Witnesses:
Walter P. Abee.
P. H. Pezzeth
Inventor,
Albert T. Sisson,
by Wright Brown Quinby & May
Attorneys.

UNITED STATES PATENT OFFICE.

ALBERT T. SISSON, OF PROVIDENCE, RHODE ISLAND, ASSIGNOR, BY MESNE ASSIGNMENTS, TO W. PENN MATHER, OF PROVIDENCE, RHODE ISLAND.

BALL-BEARING.

No. 848,776.  Specification of Letters Patent.  Patented April 2, 1907.

Application filed February 10, 1906. Serial No. 300,416.

*To all whom it may concern:*

Be it known that I, ALBERT T. SISSON, of Providence, in the county of Providence and State of Rhode Island, have invented certain new and useful Improvements in Ball-Bearings, of which the following is a specification.

The present invention relates to ball-bearings for either thrust or journal bearings, and has for its object to provide a novel holder or cage by which the balls of such bearings may be retained when the parts are being assembled or taken apart, which will prevent loss of the balls and at the same time prevent the balls becoming jammed or stuck and prevent possibility of foreign matter becoming crowded into the spaces occupied by the balls.

The invention is hereinafter described and claimed, and is illustrated in the accompanying drawings, wherein—

Figure 1 represents a side elevation of a holder embodying my invention adapted for a thrust-bearing. Fig. 2 represents an end elevation of the same. Fig. 3 represents a detail sectional view, enlarged, of one of the steps in the process in forming the bearing and the tool employed therefor. Fig. 4 represents a step of securing the balls in the holder and the tool employed for that purpose. Fig. 5 represents an elevation of my improved ball-holder adapted for a journal-bearing. Fig. 6 represents a cross-sectional view of the same on line 6 6 of Fig. 5.

The same reference characters indicate the same parts in all the figures.

In Fig. 1 I have shown a cage or holder in the form of a flat disk $a$, adapted to be interposed between the flat bearing plates or disks of an end-thrust bearing, the disk having a central orifice $b$ for the passage of a shaft. In the disk are formed a number of apertures $c$, extending between the opposite faces of the disk and completely perforating the same. In these apertures or perforations are placed antifriction-balls $d$, which are held so that they cannot escape from the perforations and protrude somewhat beyond the face of the disk, so as to take up the pressure of the bearing.

In order to secure the balls within the perforations of the disk, I form on the latter annular lips or flanges $e$, entirely surrounding the ends of the perforations and separated from the body of the disk by annular grooves $f$. These lips are integrally joined to the body of the disk along circular lines somewhat within the mouths of the perforations.

The method of forming the lips $e$ is illustrated in Fig. 3. After the perforations $c$ are made by drilling or otherwise an annular milling or grooving tool $g$ is employed. This tool has a guiding central portion $h$, which fits within the aperture $c$ and has cutting-teeth $i$ arranged in an annular series around the central portion $h$, being separated therefrom by a space $j$. The cutting-teeth act against the surface of the disk around the rim of the hole and are guided by the portion $h$ in the hole to make a groove $f$, which completely encircles the ball-receiving hole and separates the material immediately around the rim of the hole from the rest of the disk. This material forms the lip $e$. Preferably the same process is employed on both the opposite sides of the disk, and a ball $d$ is then placed in the hole. A setting-tool $k$ is then employed. This tool is of a diameter substantially equal to the outer diameter of the toothed portion of the cutting-tool, and it has an annular edge adapted to enter the grooves $f$. Within the annular edge the tool is beveled to form a tapered surface $l$, which presses against the lip $e$ with equal force on all sides and crowds the same inward toward the axis of the hole.

The material of which the disk $a$ is made is preferably of metal which is sufficiently ductile to be easily acted upon by the setting-tool, so that a uniform inclined flange is formed within each mouth of the aperture extending from a zone $m$ and inclined toward the face of the disk and axis of the hole. The flanges $e$, adjacent opposite ends of each perforation $c$, inclose between them a diametrical portion of a ball, so that the latter cannot possibly drop from the mouth of the opening. They are also bent over so close to the surface of the ball as almost to touch the same, although they are not actually quite in contact, and so do not interfere with the free rotation of the ball when the latter is engaged at diametrically opposite points by the surfaces of the bearing.

In Figs. 5 and 6 the same invention is applied to a journal-bearing. In these figures $a'$ represents a sleeve adapted to surround a shaft $p$ and having perforations $c$ containing balls $d$, which are surrounded by similar conical flanges $e$. On account of the difficulty of forming such flanges on the inner surface of the sleeve I prefer to form the perforations by using a drill which is tapered on the end and by arresting the drilling operation before the largest part of the drill has quite penetrated through the inner wall. The point of the drill, however, passing through the inner wall of the sleeve produces apertures of less diameter than the ball and leaves flanges e', which retain the ball in place. The flanges e being bent over after the balls have been placed in the holes prevent the latter becoming displaced. This method of leaving a portion of the material around one outlet of the perforation may be employed in the flat-plate form of holder, illustrated in Figs. 1 to 4; but with this form, as it is equally easy to set the flange of each side, I prefer to construct the same as first described.

I am aware that other ball-holders have been made in which isolated points or lugs were formed upon the face of the holder and bent over the balls; also that holders have been constructed by swaging or upsetting the solid material of the holder around the mouths of the ball-receiving perforations, so as partially to close the same and prevent egress of the ball; but to the best of my knowledge it is novel with me to provide a holder of the kind above described and constructed in accordance with the method described in which a flange is detached from the surrounding material and bent over the ball. This construction is of advantage over those previously used, in that it is impossible for the ball to become displaced and jammed, as may be done where detached separated lugs are used to retain it, and the flange can be crowded so close to the ball, though without actually touching it, as to prevent lumps of foreign matter which would wedge and jam the ball, causing it to stick, being allowed to enter the ball-holding openings. It is also possible to set over the flanges of my invention without applying any pressure to the material surrounding the central portion of the perforaton, so that there is no liability of the perforation becoming reduced in diameter while the ball is being secured in place, so as to bear against the same, and, finally, the flanges being thin enable the perforations c to be placed closely together, so that a large number of balls may be employed in one holder, and being thin they are so ductile that they can be forced back without injury to enlarge the orifice of the perforation when a new ball is to be introduced to take the place of a broken one. Thus replacement of balls is permitted and repair of the bearing rendered possible without providing an entirely new ball-holder and set of balls.

I claim—

1. In a ball-bearing, a ball cage or holder having perforations, balls located in said perforations, and the holder having thin flanges formed of the material thereof and partially detached therefrom, entirely surrounding the perforations and bent over so as to contract the ends thereof and retain the balls therein.

2. In a ball-bearing, a ball cage or holder having perforations, balls located in said perforations, and the holder having flanges separated from the body of the case by encircling annular spaces, extending entirely around the perforations, and inclined inward to reduce the end openings thereof and retain the balls therein.

3. In a ball-bearing, a ball cage or holder having perforations, balls located in said perforations, and the material of the holder around the mouth of each perforation being formed into a partially-detached flange or lip by a surrounding annular groove and bent inward over the ball in the perforation.

4. In a ball-bearing, a ball cage or holder having perforations, balls located in said perforations, and the cage being formed with an integral flange extending from a line or zone within the mouth of each perforation convergently toward the axis thereof and partially over the ball contained therein.

5. A ball-holder for bearings having perforations extending between opposite faces thereof, balls located in the perforations and the material immediately around the rims thereof being separated from the body of the holder and bent inwardly over the balls.

In testimony whereof I have affixed my signature in presence of two witnesses.

ALBERT T. SISSON.

Witnesses:
 MARION F. HUGHES,
 ELLWOOD E. PETTEE.